Nov. 25, 1941.  T. T. LORIMER  2,264,087
DISPLAY BOARD
Filed June 28, 1939  2 Sheets-Sheet 1

Theodore T. Lorimer
INVENTOR

BY Victor J. Evans & Co.
ATTORNEYS

Nov. 25, 1941.   T. T. LORIMER   2,264,087
DISPLAY BOARD
Filed June 28, 1939   2 Sheets-Sheet 2
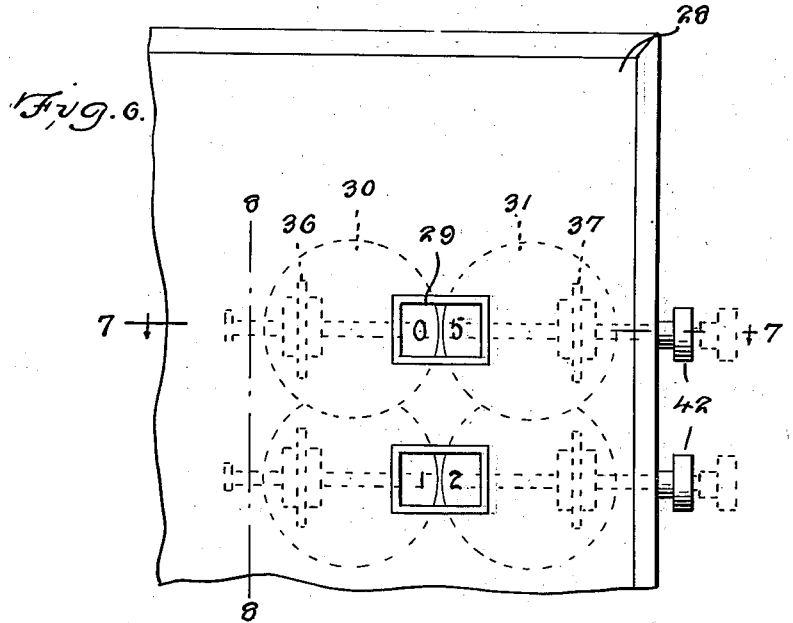
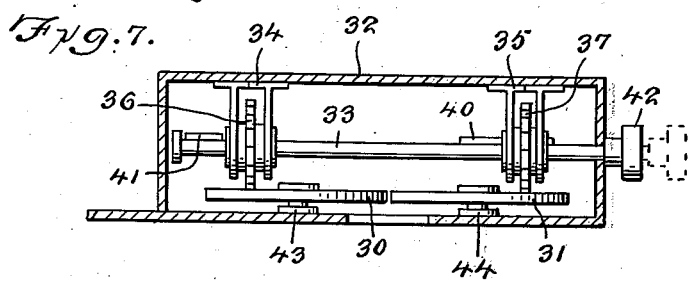
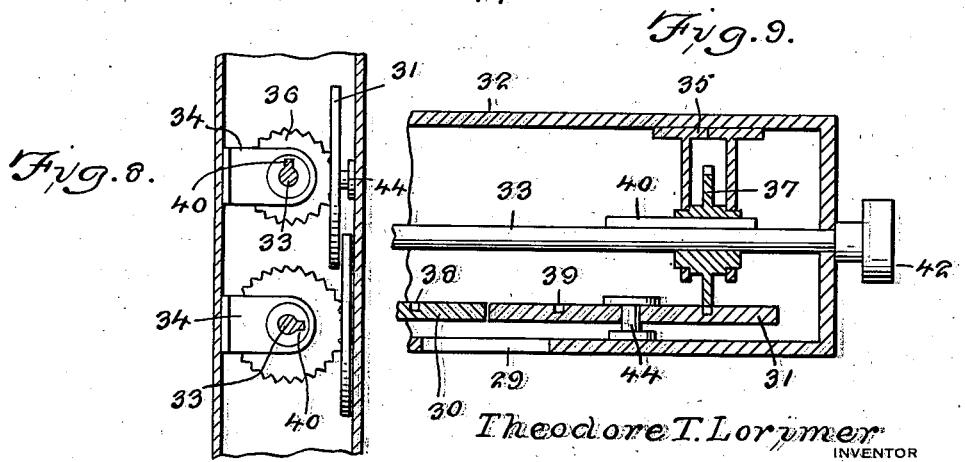
Theodore T. Lorimer
INVENTOR
BY Victor J. Evans & Co.
ATTORNEYS Patented Nov. 25, 1941

2,264,087

UNITED STATES PATENT OFFICE 2,264,087

DISPLAY BOARD

Theodore T. Lorimer, East Chicago, Ind.

Application June 28, 1939, Serial No. 281,743

3 Claims. (Cl. 40—70)

The present invention relates to new and improved game devices.

The primary object of the invention resides in the provision of a display board adapted to have listed thereon the names of various companies in which stock can be purchased or sold with means on the board to indicate the list price of the stock, the fluctuation of the prices being governed by a pair of dice or similar chance controlled devices, there being preferably provided a white and red die to indicate a positive and negative number.

A further object of the invention resides in the provision of a display board embodying novel means for indicating the fluctuating list prices of the stock appearing thereon.

A still further object of the invention resides in the provision of a display board which affords amusement to the players in that skill is required in the buying and selling of the stock, there also being present an element of chance. The board is also educational in that it teaches the operation of markets of commercial centers in the barter of securities and business reaction.

The invention will be fully and comprehensively understood from a consideration of the following detailed description when read in connection with the accompanying drawings which form a part of the application.

In the drawings:

Figure 6 is a fragmentary front elevational view of a modified form of the invention.

Figure 7 is a longitudinal sectional view being taken substantially on line 7—7 of Figure 6.

Figure 8 is a detail sectional view being taken substantially on line 8—8 of Figure 6.

Figure 9 is an enlarged detail sectional view of the parts shown in Figure 7.

Figure 1:
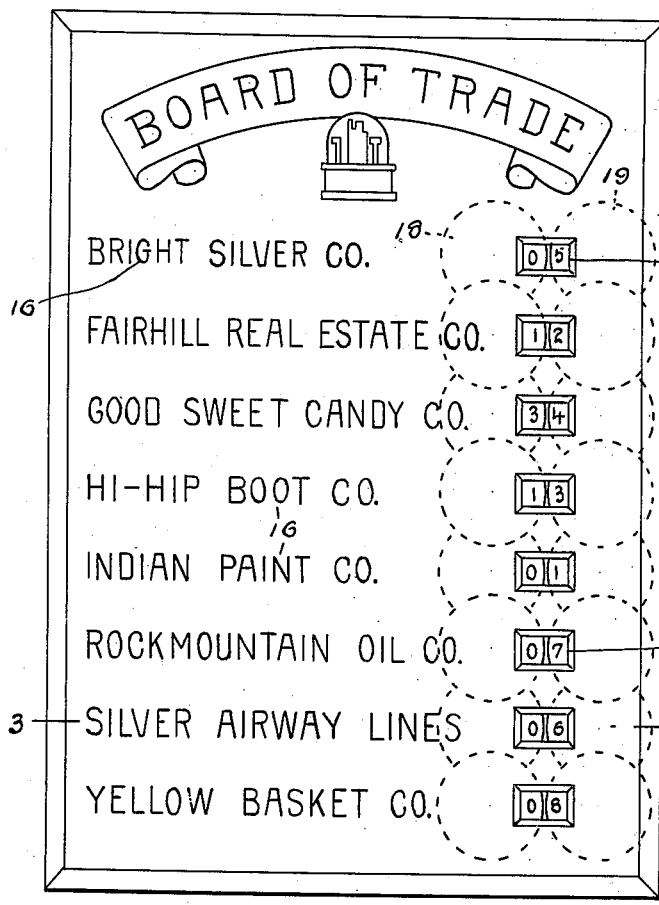
Figure 1 is a front elevational view of a display board embodying the features of the present invention.
Figure 2:
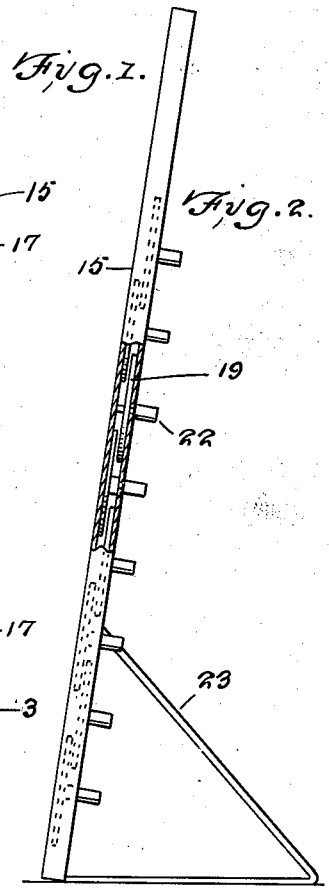
Figure 2 is a side elevational view thereof with parts in section.
Figure 3:
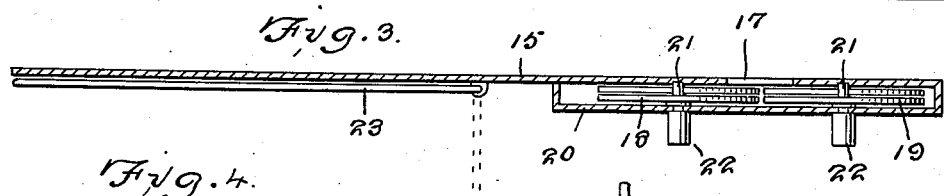
Figure 3 is a longitudinal sectional view being taken substantially on line 3—3 of Figure 1.
Figure 4:
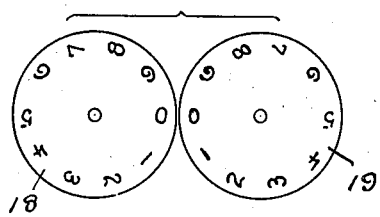
Figure 4 is a top plan view of the indicating dials.
Figure 5:
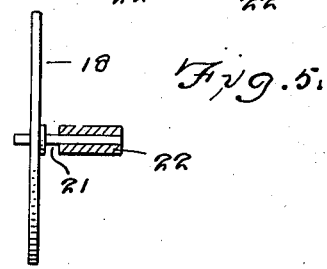
Figure 5 is a side elevational view of one of the dials.

Referring to the drawings for a more detailed description thereof and particularly Figures 1 to 5, there is disclosed a substantially rectangular-shaped stock board 15, the same being provided with a list of names 16 which may be of well known corporations. Any desired number of names may appear on the board, and directly opposite each name a window-like opening 17 is formed through which the numbers appearing on the dials 18 and 19, respectively, will appear. As shown in Figure 4 of the drawings, the dials 18 and 19 are each numbered from zero to nine, the dial 18 adapted to rotate in clockwise direction and the dial 19 to rotate in counter-clockwise direction.

The back of the board 15 is offset as shown at 20 forming a compartment for mounting the dials 18 and 19. Each dial is supported on stems 21 which extend through the dials with the inner end thereof engaging the board 15 forming a bearing surface. Each dial will be independently rotated by means of its stem 21. The dials will be supported on the board with the edges thereof overlapping without contacting, as shown in the drawings. If desired, each stem 21 may be provided with a covering 22 of rubber or similar material.

A support or back rest 23 formed of wire or similar light weight material is swingably attached to the back of the board 15, said support being substantially triangular-shaped with the end portions of the wire secured to the back by any desired means.

In the modified form of the invention shown in Figures 6 to 9 inclusive, the external appearance of the board 28 is identical with that of the preferred form the same being provided with aligned openings or windows 29 through which the numbers on the outer edge of one face of the dials 30 and 31 will appear. The back of the board, however, is formed with a housing 32 which supports the mechanism for rotating the dials 30 and 31, respectively. Each pair of dials 30 and 31, respectively, are rotated by means of the shaft 33 journalled in the pairs of bearings 34 and 35, respectively, secured by any desired means to one wall of the housing 32. Supported on the shaft between each pair of the bearings 34 and 35 is a toothed wheel 36 and 37, respectively, adapted to engage slots 38 and 39 disposed circumferentially of the dials 30 and 31, respectively. The toothed wheel 37 is formed with a hub supported between the bearings 35 and is secured to the shaft 33 by means of a key 40 and rotates with said shaft. The toothed wheel 36, however, is loosely mounted on the shaft with the hub of the wheel being supported between the bearings 34 and the same is formed with a slot adapted to receive the key 41 when said shaft is moved to the dotted line position. In the position shown in full lines in Figures 7 and 9 of the drawings, rotation of the shaft 33 through the end 42 will rotate the dial 31 only, the same rotating in a counter-clockwise direction. However, when the shaft 33 is moved to the dotted line position shown in Figure 7 of the drawings, the key 41 will engage a corresponding slot formed in the hub of the wheel 36 thereby causing said wheel to rotate with a consequent rotation in a clockwise direction of the dial 30. Thus it will be seen that a means has been provided for rotating the dial 31 independently of the dial 30 or for rotating both dials in unison. As shown, the shaft 33 extends beyond one side of the board with a similar arrangement being provided for each of the pairs of dials. The dials 30 and 31 are mounted on members 43 and 44, respectively, secured by any desired means to the inner surface of the wall of the board 28 and are arranged so that the edges of the dials overlap as more clearly shown in Figure 8 of the drawings.

It will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. A display board having a group of names appearing thereon for indicating listed stocks, a housing formed on the rear face of said board and extending longitudinally along one edge thereof, said board having openings formed therein opposite each name listed and communicating with said housing, clockwise and counter-clockwise rotating dials supported in spaced relation within said housing and pivotally attached to the rear face of said board, a certain area of each dial being visible through said openings, means carried by said housing for rotating said counter-clockwise dial independently of said clockwise dial, and means for rotating said dials in unison.

2. A display board having a group of names appearing thereon for indicating listed stocks, a housing formed on the rear face of said board and extending longitudinally along one edge thereof, said board having openings formed therein opposite each name listed and communicating with said housing, clockwise and counter-clockwise rotating dials supported in spaced relation within said housing and pivotally attached to the rear face of said board, a certain area of each dial being visible through said openings, bearing members secured to the back wall of said housing and spaced from the rear of said dials, a shaft journaled in said bearings having one end projecting beyond one side of the board, and means mounted on said shaft having engagement with said dials for rotating said counter-clockwise dial independently of said clockwise dial and for rotating said dials in unison.

3. A display board having a group of names appearing thereon for indicating listed stocks, a housing formed on the rear face of said board and extending longitudinally along one edge thereof, said board having openings formed therein opposite each name listed and communicating with said housing, clockwise and counter-clockwise rotating dials supported in spaced relation within said housing and pivotally attached to the rear face of said board, a slot formed circumferentially of the rear face of each of said dials, bearing members secured to the back wall of said housing and spaced from said dials, a shaft rotatably and slidably mounted in said bearings and having one end projecting beyond one side of the board, a toothed wheel supported on said shaft by said bearings, said wheels adapted to engage said slots upon actuation of said shaft for rotating said counter-clockwise dial independently of said clockwise dial or for rotating said dials in unison.

THEODORE T. LORIMER.